Sept. 16, 1958  E. E. HAMEL  2,852,532
PRODUCTION OF 1,4-DICHLOROBUTANE
Filed July 30, 1956
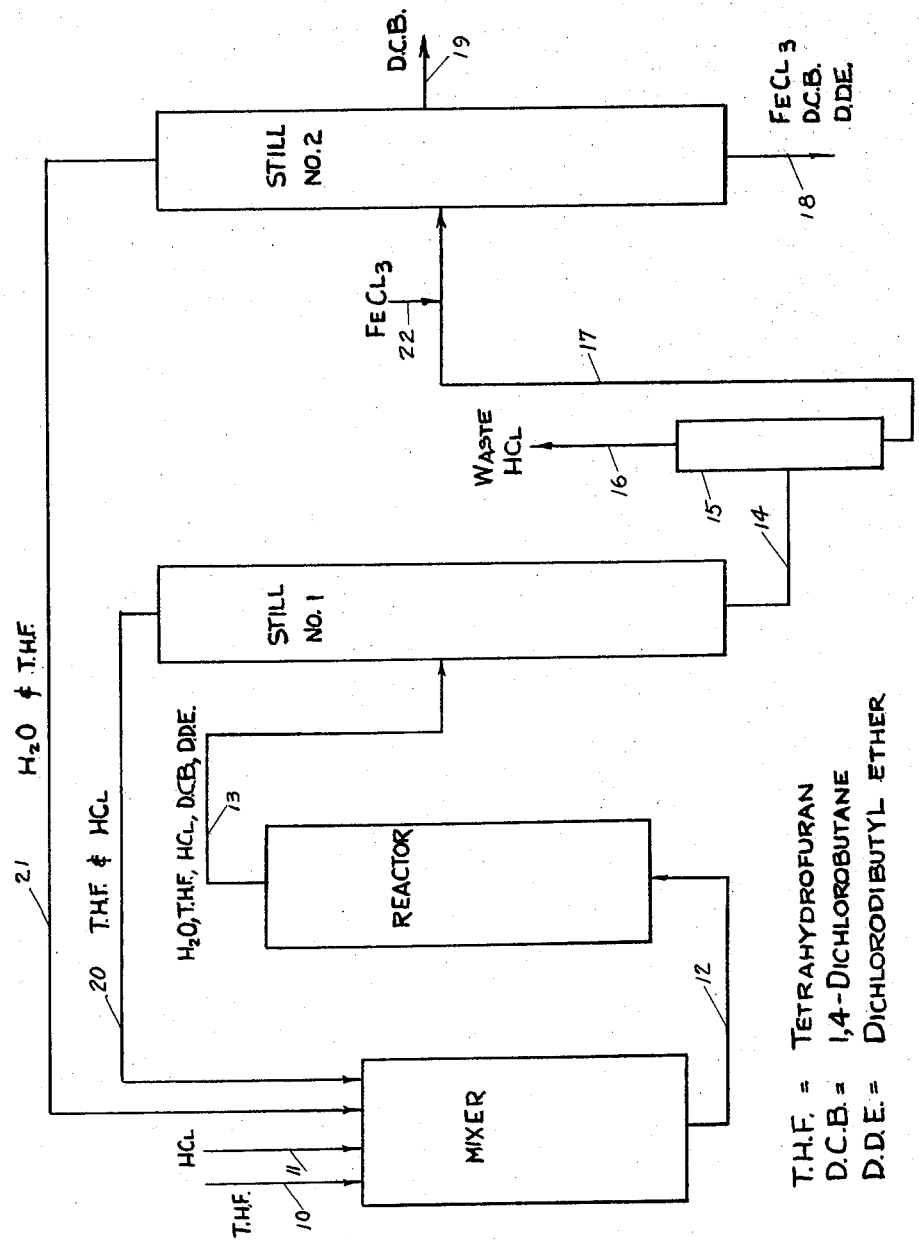
T.H.F. = TETRAHYDROFURAN
D.C.B. = 1,4-DICHLOROBUTANE
D.D.E. = DICHLORODIBUTYL ETHER
INVENTOR.
EDWARD E HAMEL
BY
ATTORNEY

United States Patent Office 2,852,532
Patented Sept. 16, 1958

2,852,532
PRODUCTION OF 1,4-DICHLOROBUTANE

Edward E. Hamel, Niagara Falls, N. Y., assignor to E. I. du Pont de Nemours and Company, Wilmington, Del., a corporation of Delaware Application July 30, 1956, Serial No. 600,967

12 Claims. (Cl. 260—346.1)

This invention relates to the production of 1,4-dichlorobutane by the reaction of hydrogen chloride on tetrahydrofuran.

The synthesis of 1,4-dichlorobutane by the hydrochlorination of tetrahydrofuran is well known. It may be represented broadly by the equation:

(1)
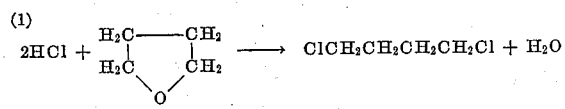

Several processes have been based upon this reaction. Some of these have been quite straightforward as, for example, that of French Patent 1,045,827. More often, however, the processes have involved the employment of a catalyst such as the sulfuric acid of U. S. Patent 2,218,018, the heterocyclic amines of Patent 2,168,167 or the metal salts of A. P. C. Publication 334,582.

An additional reaction, the production of 4,4'-dichlorodibutyl ether, is common to all of these processes and may detract greatly from the yield of dichlorobutane obtained. An equation for this side-reaction may be written as:

(2)
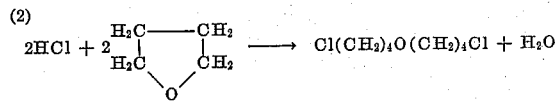

An object of this invention is, consequently, to effect improvements in the synthesis of 1,4-dichlorobutane from tetrahydrofuran.

Another object is to provide a method for producing 1,4-dichlorobutane from tetrahydrofuran without the concomitant production of 4,4'-dichlorodibutyl ether.

A further object is to provide a method for converting 4,4'-dichlorodibutyl ether to products of more general utility.

The above-mentioned and still further objects are achieved in accordance with this invention by a process in which the dichlorodibutyl ether or liquid mixtures containing the same are heated in the presence of a metal chloride catalyst such as ferric chloride, zinc chloride, antimony chloride, bismuth chloride and aluminum chloride. As a result, the dichlorodibutyl either is converted to 1,4-dichlorobutane and tetrahydrofuran as represented by the equation:

(3)
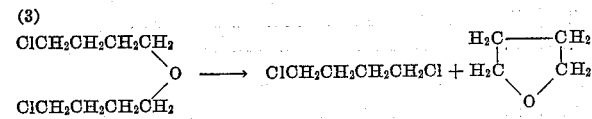

Ferric chloride is the preferred catalyst. However, in general, inorganic halides of the type which catalyze the formation and splitting of ether and acetal linkages are effective. For the purposes of this invention, catalysts having boiling points above that of dichlorobutane (ca. 160° C.) are essential in order that the dichlorobutane product may be readily separated in a pure state by distillation of the reaction mixture. Other compounds of the metals involved in the halide catalyst or the metals themselves may also prove effective since these may be converted to the desired catalyst by reaction in the system. Details of the invention will be apparent from the remainder of the specification and the accompanying drawing which represents a continuous process embodying the invention.

As noted above ferric chloride serves as the preferred catalyst. The quantity necessary is not sharply critical and may simply be designated as "an effective catalytic amount." In practice, between about 0.02 and 0.5% by weight is generally preferred. It may be noted that ferric chloride is soluble to the extent of only about 0.1–0.2% by weight in the organic compounds of the present process, i. e. tetrahydrofuran, 4,4'-dichlorodibutyl ether and 1,4-dichlorobutane. The presence of a small amount of water is permissible and the catalyst may be added as an aqueous solution.

The temperature and pressure required for the decomposition are likewise not critical. However, some elevation of the temperature is essential, the rate of decomposition becoming appreciable only at 80°–110° C. Since a hold-up time of 6–7 hours may be required at these low temperatures, higher temperatures are preferred. The dichlorodibutyl ether containing 0.35% ferric chloride is 70% decomposed after one hour at 120° C. Hold-up time can be cut to an hour or less at 160°–180° C. in the presence of low concentrations of ferric chloride.

If the tetrahydrofuran produced is allowed to remain in contact with the mixture, the reaction is inhibited. Preferably, therefore, tetrahydrofuran is continuously removed by fractional distillation as it is formed. To achieve this end, the reaction mixture should be held well above the boiling point of tetrahydrofuran (about 66° C. at 760 mm. of Hg pressure). Ambient pressure is the most convenient but super- or sub-atmospheric pressures may be used if desired. Some reflux of the reaction mixture is generally employed.

The invention may be employed in a batch process but is preferably operated in a continuous manner. One such continuous embodiment of the invention is illustrated in the figure. Streams of liquid tetrahydrofuran and gaseous hydrogen chloride are shown entering the mixer through lines 10 and 11 respectively together with recycled reagents through lines 20 and 21. The mixed reagents are then passed through line 12 into the reactor, which is heated, and where 1,4-dichlorobutane is produced together with water and 4,4'-dichlorodibutyl ether. Water may be removed at this point if desired or passed together with the other products and unreacted reagents through line 13 into still No. 1. This still, which includes a reflux condenser, strips unreacted tetrahydrofuran and hydrogen chloride gas from the mixture and returns them to the mixer through line 20. The bottom product of still No. 1, consisting of the dichlorobutane, the dichlorodibutyl ether and aqueous hydrogen chloride, is sent through line 14 to a phase separator 15, where the waste aqueous hydrogen chloride is decanted through line 16. The non-aqueous product phase may be washed with aqueous alkali at this point to remove traces of acid or sent directly, as indicated, to still No. 2 through line 17. The latter is arranged to introduce a small amount of ferric chloride through line 22. In still No. 2, the dichlorodibutyl ether is catalytically decomposed in the liquid phase reaction which takes place at the bottom of the still. A portion of the tetrahydrofuran and a trace of water condensed as reflux at the top of the still are continuously returned to the mixer through line 21. Purified 1,4-dichlorobutane is fractionated and recovered as a side stream from the middle plates of this still. Ferric chloride together with a small amount of the undecomposed dichlorodibutyl ether and dichlorobutane is continuously withdrawn from the still bottom through line 18. 1,4-dichlorobutane containing less than 0.1% by weight 4,4'-dichlorodibutyl ether can be obtained in a system, such as that described, from a mixture originally containing 30% or more of the chloro-ether. Those skilled in the art will appreciate that embodiments of the invention other than that shown are operable. For example, the ferric chloride or alternate decomposition catalyst may be introduced into a liquid phase at other convenient points in the system. It is only necessary that the catalyst be added at some point which will insure its presence at the bottom of the final still (still No. 2 in the figure). Introduction at the final distillation stage is preferred because the ether cannot be formed after this stage.

The following examples illustrate the invention. In these examples all percentages are by weight and all pressures are approximately atmospheric unless otherwise noted.

EXAMPLE 1

A series of tests were carried out by refluxing mixtures of 1,4-dichlorobutane containing 4,4'-dichlorodibutyl ether under reflux conditions and determining the effect of ferric chloride on the rate of ether decomposition. Results are shown in Table I.

Table I

| Initial Concentration of Ether in Mixture, Wt. Percent | Ferric Chloride Conc. in Mixture, Wt. Percent | Ether Decomposed in One Hour, Wt. Percent |
| --- | --- | --- |
| 28.0 | 0.00 | 0.00 |
| 28.0 | 0.02 | 3.5 |
| 28.0 | 0.08 | 12.1 |
| 8.3 | 0.02 | 2.5 |
| 49.6 | 0.02 | 8.5 |

In these tests, the tetrahydrofuran produced from ether decomposition was not removed. This lowered reaction rates since the tetrahydrofuran inhibits the reaction and also lowers the reflux temperature which results in still further reduction in rate.

EXAMPLE 2

In this experiment, an approximately 25% solution of the dichlorodibutyl ether in 1,4-dichlorobutane was refluxed in the presence of approximately 0.02% ferric chloride with continuous removal of tetrahydrofuran by fractional distillation. This mixture is similar to that obtained by separating water from the first still in a system similar to that of the figure. Results are shown in Table II.

Table II

| Time, Hrs. | Ether Conc. in Still Bottoms, Wt. Percent | Ether Decomposed, Wt. Percent |
| --- | --- | --- |
| 0 | 25.3 | 0 |
| 0.25 | 24.4 | 3.6 |
| 0.50 | 22.7 | 10.3 |
| 1.0 | 20.9 | 17.4 |
| 1.5 | 19.6 | 22.5 |
| 2.5 | 16.6 | 34.4 |
| 3.5 | 15.5 | 38.7 |
| 5.5 | 14.3 | 43.5 |

The above figures demonstrate the utility of the catalytic process for continuous decomposition of the dichlorodibutyl ether.

I claim:
1. The method of converting 4,4'-dichlorodibutyl ether to tetrahydrofuran and 1,4-dichlorobutane which comprises heating the said ether at a temperature of 80° C. or above in the presence of at least about 0.02% by weight of a catalyst selected from the group consisting of ferric chloride, zinc chloride, antimony chloride, bismuth chloride and aluminum chloride.
2. The method of claim 1 in which the catalyst is ferric chloride.
3. The method of claim 2 in which the conversion is carried out under reflux conditions.
4. The method of claim 3 in which the conversion is carried out accompanied by simultaneous removal of tetrahydrofuran.
5. The method of claim 4 in which the removal is accomplished by fractional distillation.
6. In the manufacture of 1,4-dichlorobutane by the reaction of hydrogen chloride with tetrahydrofuran, the step of destroying the 4,4'-dichlorodibutyl ether in the reaction product which comprises supplying at least about 0.02% by weight of ferric chloride to said product and fractionally distilling 1,4-dichlorobutane therefrom.
7. The method of purifying 1,4-dichlorobutane contaminated with 4,4'-dichlorodibutyl ether which comprises heating at about 160° to 180° C. in the presence of 0.02 to 0.2% by weight of a catalyst selected from the group consisting of ferric chloride, zinc chloride, antimony chloride, bismuth chloride and aluminum chloride and fractionally distilling tetrahydrofuran and 1,4-dichlorobutane therefrom.
8. The method of claim 7 in which the catalyst is ferric chloride.
9. The method of continuously purifying 1,4-dichlorobutane contaminated with 4,4'-dichlorodibutyl ether which comprises continuous addition thereto of an effective catalytic amount of ferric chloride followed by continuous fractional distillation at about atmospheric pressure in a column so that tetrahydrofuran vapors are continuously removed from the top of the column, while 1,4-dichlorobutane is being removed as a side stream distillate fraction from the column and catalyst in combination with a small amount of 1,4-dichlorobutane and undecomposed 4,4'-dichlorodibutyl ether is being withdrawn from the bottom of the column.
10. The method of decomposing 4,4'-dichlorobutyl ether which comprises heating the said ether in the presence of an effective catalytic amount of a catalyst selected from the group consisting of ferric chloride, zinc chloride, antimony chloride, bismuth chloride and aluminum chloride at a temperature of at least 80° C. and obtaining 1,4-dichlorobutane as a reaction product.
11. The method of claim 10 in which the catalyst is ferric chloride.
12. The method of continuously purifying, substantially water-free 1,4-dichlorobutane, produced by the reaction of tetrahydrofuran with hydrogen chloride and containing 4,4'-dichlorodibutyl ether as an impurity, which comprises continuous fractional distillation of the said dichlorobutane in the presence of 0.02 to 0.2% by weight of ferric chloride.

References Cited in the file of this patent

UNITED STATES PATENTS

| 2,218,018 | Cass | Oct. 15, 1940 |
| 2,491,834 | Scott | Dec. 20, 1949 |

FOREIGN PATENTS

| 859,734 | Germany | Dec. 15, 1952 |
| 859,884 | Germany | Feb. 5, 1953 |

OTHER REFERENCES

Fried: J. A. C. S. 63: 2691 (1941).
Ser. No. 334,582, Trieschmann (A. P. C.), published June 8, 1943.